(12) United States Patent
Nara

(10) Patent No.: US 9,335,186 B2
(45) Date of Patent: May 10, 2016

(54) INDEX ERROR ESTIMATING APPARATUS, INDEX ERROR CALIBRATING APPARATUS, AND INDEX ERROR ESTIMATING METHOD

(75) Inventor: Masayuki Nara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 777 days.

(21) Appl. No.: 13/552,913

(22) Filed: Jul. 19, 2012

(65) Prior Publication Data

US 2013/0019652 A1 Jan. 24, 2013

(30) Foreign Application Priority Data

Jul. 22, 2011 (JP) .................................. 2011-160609

(51) Int. Cl.
*G01C 17/38* (2006.01)
*G01D 5/38* (2006.01)
(52) U.S. Cl.
CPC ........................................ *G01D 5/38* (2013.01)
(58) Field of Classification Search
CPC ..................................................... G01D 18/00
USPC ....................................... 73/1.75, 1.79, 1.37; 250/231.13–231.18; 356/237, 373, 356/375, 423; 359/53.22, 44.26
See application file for complete search history.

(56) References Cited

U.S. PATENT DOCUMENTS

| | | | | |
|---|---|---|---|---|
| 4,928,009 A * | 5/1990 | Ikebe et al. | ............... | 250/231.13 |
| 5,889,534 A * | 3/1999 | Johnson et al. | ................... | 347/19 |
| 6,145,368 A * | 11/2000 | Klein | .............. | 73/1.75 |
| 6,304,825 B1 * | 10/2001 | Nowak et al. | .................... | 702/94 |
| 7,840,372 B2 * | 11/2010 | Lu | ................... | 702/151 |
| 8,134,359 B2 * | 3/2012 | Nishizawa et al. | ....... | 324/207.25 |
| 2004/0179885 A1* | 9/2004 | Adkins et al. | .............. | 400/636.1 |
| 2008/0149816 A1* | 6/2008 | Wang et al. | .............. | 250/231.18 |
| 2009/0030638 A1* | 1/2009 | Lu | .................... | 702/94 |
| 2012/0283978 A1* | 11/2012 | Watanabe | ....................... | 702/94 |

OTHER PUBLICATIONS

Watanabe et al., Automatic High Precision Calibration System for Rotary Encoder, Journal of Society of Precision Engineering, vol. 67 No. 7, Sep. 2000, pp. 1091-1095.*
Watanabe et al., "Automatic High Precision Calibration System for Rotary Encoder (First Issue)", Journal of the Japan Society for Precision Engineering vol. 67 No. 7, 2001, pp. 1091-1095.

* cited by examiner

*Primary Examiner* — Hezron E Williams
*Assistant Examiner* — Hoang Nguyen
(74) *Attorney, Agent, or Firm* — Greenblum & Bernstein, P.L.C.

(57) ABSTRACT

An index error estimating apparatus used for an index error calibrating apparatus that has a grating disk supported by a rotation shaft and four detectors arranged on the grating disk. The index error estimating apparatus includes a detected value synthesizer that calculates a linear sum by multiplying by a predetermined coefficient each of detected values obtained from each of the at least four detectors; and a Fourier component identifier that uses a Fourier component of the linear sum and identifies a Fourier component of the index error.

3 Claims, 4 Drawing Sheets

RELATED ART

INDEX ERROR ESTIMATING APPARATUS, INDEX ERROR CALIBRATING APPARATUS, AND INDEX ERROR ESTIMATING METHOD

CROSS-REFERENCE TO RELATED APPLICATIONS

The present application claims priority under 35 U.S.C. §119 of Japanese Application No. 2011-160609, filed on Jul. 22, 2011, the disclosure of which is expressly incorporated by reference herein in its entirety.

BACKGROUND OF THE INVENTION

1. Field of the Invention

The present invention relates to an index error estimating apparatus, an index error calibrating apparatus, and an index error estimating method.

2. Description of Related Art

A rotary encoder is an index error calibrating apparatus that detects a rotation angle of a rotation mechanism. The rotary encoder includes, as its basic structure, a circular grating disk and a detector, for example, the grating disk being etched with an index pattern including index marks of several hundreds to several hundred thousands in a radial direction in an external peripheral portion, the detector being arrayed on the grating disk and counting index marks which pass by as the grating disk rotates. Such a rotary encoder is provided such that the grating disk engages a rotating portion of an object to be measured. The number of index marks passing by the detector in association with rotation of the object to be measured is counted to detect a rotation angle of the object to be measured (i.e., rotation angle of the grating disk).

Normally, such a grating disk as described above has index marks that are artificially marked. Therefore, the index marks are not marked at even angular distances, and therefore deviate from ideal index mark positions (having even angular distances). Accordingly, detected values detected by the detector based on the index marks as described above contain errors (hereinafter referred to as index error). For calibrating such an index error, an equal division averaging method is conventionally used (see, for example, WATANABE, et al., "Automatic High Precision Calibration System for Rotary Encoder (First Issue)," Journal of the Japan Society for Precision Engineering Vol. 67 No. 7 (2001), 1091-1095).

FIG. 4 illustrates a conventional method to calibrate index errors. A conventional index error calibrating apparatus 100 employs, as shown in FIG. 4, a grating disk 200A for calibration provided on a coaxial rotation shaft 220; and a grating disk 200B for reference. An external periphery of the grating disk 200A for calibration is provided with a first detector 300A opposing the index pattern 210 of the grating disk 200A. An external periphery of the grating disk 200B for reference is provided with a plurality (six in the example shown in FIG. 4) of second detectors 300B opposing the index pattern 210 of the grating disk 200B, each of the detectors having an even angular distance along the circumferential direction of the grating disk 200B. A calculating apparatus (not shown in the drawing) configuring the index error calibrating apparatus 100 calculates differences between a detected value of the first detector 300A and each of the detected values of the second detectors 300B; obtains an index error by averaging the calculated differences; and calibrates the detected value of the first detector 300A with the index error.

Incidentally, the even division averaging method generally has a disadvantage where it is impossible to identify a Fourier component of an index error when the Fourier component is multiple of the number of detectors. Accordingly, in order to estimate a highly accurate index error that does not lack a component including a higher degree component, the number of the detectors (second detectors 300B) arranged at even angular distances needs to be increased. However, due to size restriction of the grating disk, the number of the detectors that can be arranged is also limited, thereby making it difficult to identify a higher degree component in practical use.

SUMMARY OF THE INVENTION

The present invention provides an index error estimating apparatus, an index error calibrating apparatus, and an index error estimating method, that can estimate a highly accurate index error while keeping a number of detectors to a minimum.

The index error estimating apparatus according to an aspect of the present invention is used for an index error calibrating apparatus that has a grating disk supported by a rotation shaft and at least four detectors arranged on the grating disk. The index error estimating apparatus includes a detected value synthesizer that calculates a linear sum by multiplying by a predetermined coefficient each of detected values obtained from each of the at least four detectors; and a Fourier component identifier that uses a Fourier component of the linear sum and identifies a Fourier component of the index error.

The index error estimating apparatus according to the aspect of the present invention includes the above-described detected value synthesizer and the Fourier component identifier. Accordingly, the index error estimating apparatus can compare the Fourier component of the index error and the Fourier component of the linear sum, which is calculated by multiplying by a predetermined coefficient, each of detected values obtained from each of the at least four detectors. The index error estimating apparatus can then identify the Fourier component of the index error. Accordingly, while minimizing the number of the detectors, it is possible to estimate a highly accurate index error that does not lack any component including a higher degree component.

With the index error estimating apparatus according to the aspect of the present invention, the predetermined coefficient is preferably defined so as to remove a rotation angle and a kinematic error contained in the linear sum. Incidentally, the detection value of the detector includes, in addition to the index error, a deflection (hereinafter referred to as kinematic error) of the grating disk with respect to a rotation angle of the grating disk when the grating disk is rotated. In other words, the linear sum calculated by the detection value synthesizer is configured with a term related to the rotation angle of the grating disk, a term related to the index error, and a term related to the kinematic error.

Accordingly, when simply comparing the Fourier component of the linear sum and the Fourier component of the index error, the Fourier component of the index error cannot be identified, since the linear sum contains terms related to the rotation angle of the grating disk and to the kinematic error. However, according to the aspect of the present invention, the coefficient is defined as described above. Therefore, it is possible to remove, from the linear sum, terms related to the rotation angle of the grating disk and the kinematic error, and by comparing the Fourier component of the linear sum and the Fourier component of the index error, it is possible to identify the Fourier component of the index error.

An index error calibrating apparatus according to an aspect of the present invention includes a grating disk supported by a rotation shaft; and at least four detectors arranged on the grating disk. The index error calibrating apparatus includes the above-described index error estimating apparatus. Since the index error calibrating apparatus according to the aspect of the present invention includes the above-described index error estimating apparatus, it is possible to obtain similar effects and advantages to the index error estimating apparatus as described above. Further, by using an estimated highly accurate index error, it is possible to preferably estimate the rotation angle of the grating disk as an angle having no index error.

Incidentally, with the conventional index error calibrating apparatus 100, a deflection (kinematic error) when the grating disk 200B for reference is rotated can be removed by using each of the detected values of a plurality of the second detectors 300B. However, as for the grating disk 200A for calibration, only one first detector 300A is provided. Therefore, the detected value of the first detector 300A includes, in addition to the index error, a deflection (kinematic error) when the grating disk 200A for calibration is rotated. Therefore, even when the detection value of the first detector 300A is calibrated using the index error, the kinematic error remains. Thus, a rotation angle of the grating disk 200A for calibration is not preferably estimated.

In contrast, according to the aspect of the present invention, at least four detectors are provided to the grating disk. Therefore, using each of the detected values obtained from the at least four detectors respectively, it is possible to preferably estimate the rotation angle of the grating disk as an angle having no kinematic error. Therefore, the rotation mechanism of the grating disk is not required to be extremely accurate, thereby reducing the cost for manufacturing the index error calibrating apparatus.

The index error estimating method according to an aspect of the present invention is used for an index error calibrating apparatus that has a grating disk supported by a rotation shaft and at least four detectors arranged on the grating disk. The index error estimating method includes synthesizing detected values to calculate a linear sum by multiplying by a predetermined coefficient each of the detected values obtained from each of the at least four detectors; and identifying a Fourier component of the index error by using a Fourier component of the linear sum. Furthermore, since the index error estimating method according to the aspect of the present invention is a method used by the above-described index error calibrating apparatus, it is possible to obtain similar effects and advantages to the index error calibrating apparatus as described above.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention is illustrated below with reference to the drawings.
(Configuration of Index Error Calibrating Apparatus)

Figure 1:
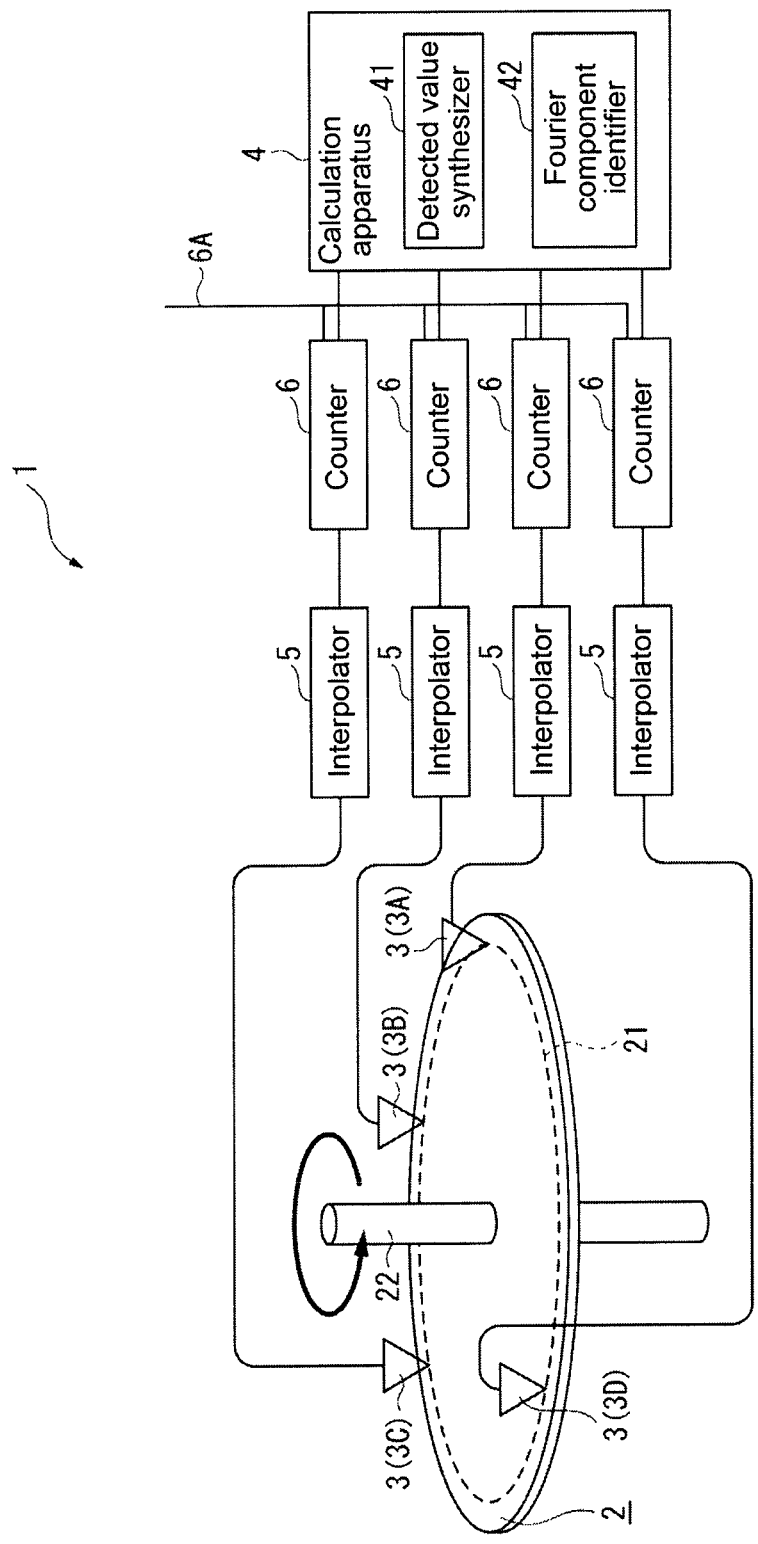
FIG. 1 is a schematic diagram illustrating a configuration of an index error calibrating apparatus according to an embodiment of the present invention.

FIG. 1 is a schematic diagram illustrating a configuration of an index error calibrating apparatus 1 according to an embodiment of the present invention. An index error calibrating apparatus 1 is configured with a rotary encoder that includes a grating disk 2, a detector 3, a calculation apparatus 4, and the like, as shown in FIG. 1. The grating disk 2 is formed into a circular disk shape on which an index pattern 21 is etched along the external perimeter. The grating disk 2 is pivotally and rotatably supported by a rotation shaft 22. The index pattern 21 is not illustrated in detail in the drawing, but is configured with fine index marks extending in a radial direction of the grating disk 2.

The detector 3 is arranged opposite from the index pattern 21 and outputs, when the grating disk 2 rotates, a detected signal having a sinusoidal wave corresponding to the index marks passing the detector 3. In this embodiment, as shown in FIG. 1, four of the detectors 3 are arranged along the external perimeter of the grating disk 2. Output from the four detectors 3 is transmitted to the calculation apparatus 4 via four sets of interpolators 5 and counters 6. Further, the counters 6 receive input from a latch signal and an initialization signal 6A from an external source, and each of the counters 6 performs scanning of the current count and resetting of the counter to zero.

The calculation apparatus 4 processes the detected signal input from the detectors 3, via the interpolators 5 and the counters 6, and estimates an rotation angle, a change amount, an angular speed, and the like of the grating disk 2. The calculation apparatus 4 is configured with a computer system that executes a process based on a specified program. The calculation apparatus 4 is operated from an external input device (not shown in the drawing) and outputs a signal and/or a video image to an output device.

In the calculation apparatus 4 shown in FIG. 1, only functionality for performing a main portion of the present invention is illustrated. For example, the calculation apparatus 4 acts as an index error estimating apparatus according the present invention, and includes a detected value synthesizer 41 and a Fourier component identifier 42 as shown in FIG. 1. The detected value synthesizer 41 calculates a linear sum (also referred to as a "linear combination") by multiplying by a predetermined coefficient each of the detected values obtained from each of the detectors 3. The Fourier component identifier 42 uses a Fourier component of the linear sum calculated by the detected value synthesizer 41 and identifies a Fourier component of the index error.
(Index Error Estimating Method)

Figure 2:
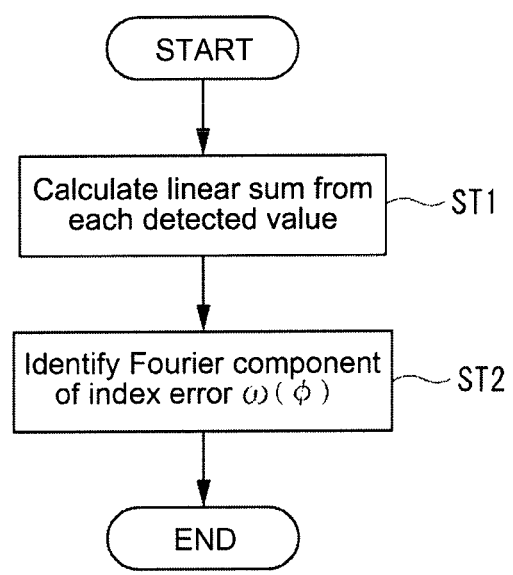
FIG. 2 is a flowchart illustrating an index error estimating method according to the embodiment.
Figure 3:
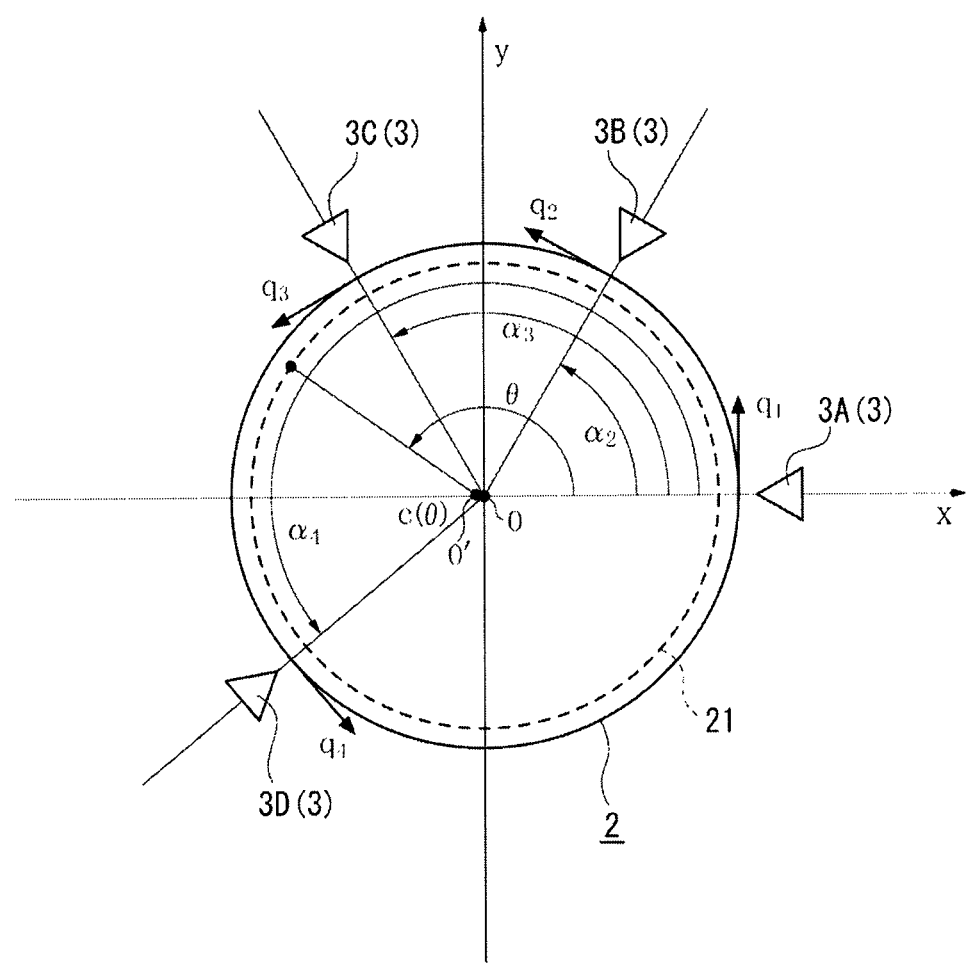
FIG. 3 illustrates the index error estimating method according to the embodiment.
Figure 4:
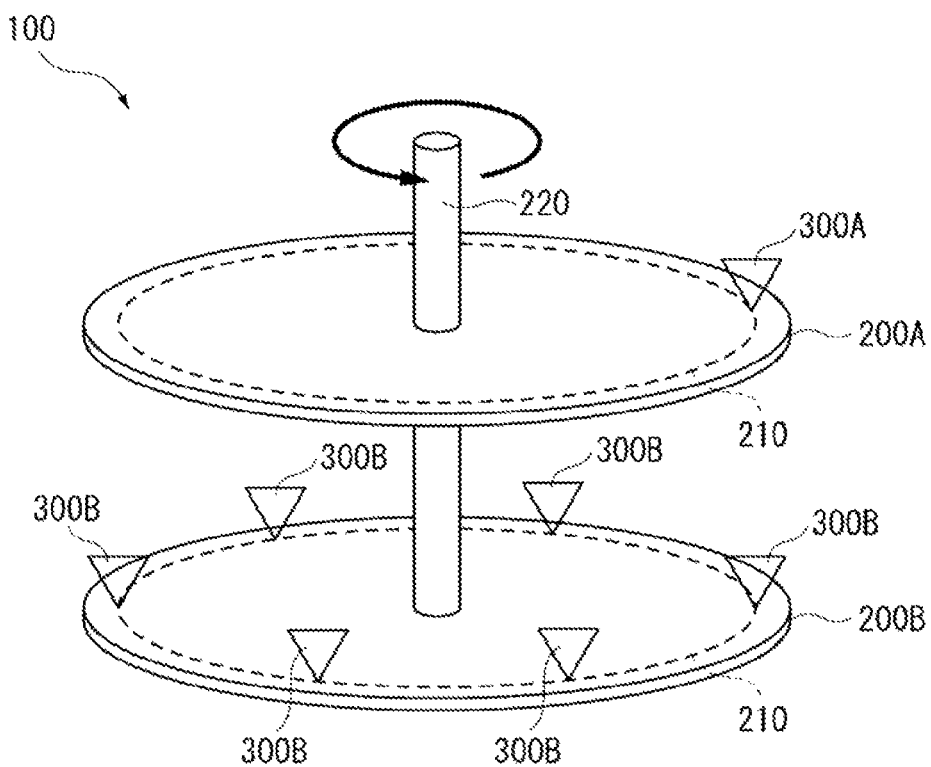
FIG. 4 illustrates a conventional index error calibrating method.

Next, an index error estimating method using the calculation apparatus 4 is described. FIG. 2 is a flowchart illustrating the index error estimating method. FIG. 3 illustrates the index error estimating method according to the embodiment. For ease of illustration, the following example refers to the four detectors 3 as first through fourth detectors 3A-3D as shown in FIG. 3. In addition, on a planar surface that is orthogonal to the rotation shaft 22, two axes that mutually intersect orthogonally are named an X axis and a Y axis. As shown in FIG. 3, the first detector 3A is provided on the X axis in this example. The second through fourth detectors 3B-3D are arranged in an uneven pitch (uneven angular distance) from the position of the first detector 3A on the external perimeter of the grating disk 2. In this example, to illustrate the positional relationship of the first through fourth detectors 3A-3D, each angle from the X axis is respectively defined as $\alpha_1$-$\alpha_4$. Since the first detector 3A is provided on the X axis, the position (angle: $\alpha_1$) of the first detector 3A is "0".

First, the calculation apparatus 4 (detected value synthesizer 41) processes the detected signals input, via the interpolators 5 and the counters 6, from the first through fourth detectors 3A-3D when the grating disk 2 is rotated. Then, the calculation apparatus 4 (detected value synthesizer 41) multiplies each of the detected values detected by the first through fourth detectors 3A-3D by a predetermined coefficient, and obtains a linear sum (step ST1: detection value synthesizing step). In this example, each of the detected values $m_1(\theta)$-$m_4(\theta)$ obtained from the first through fourth detectors 3A-3D is expressed in the following expression 1.

(Expression 1)

$$m_1(\theta) = \theta + \omega(\theta + \alpha_1) + \frac{q_1 \cdot c(\theta)}{r}, \quad (1)$$
$$q_1 = [-\sin(\alpha_1) \quad \cos(\alpha_1)], \alpha_1 = 0$$
$$m_2(\theta) = \theta + \omega(\theta + \alpha_2) + \frac{q_2 \cdot c(\theta)}{r},$$
$$q_2 = [-\sin(\alpha_2) \quad \cos(\alpha_2)]$$
$$m_3(\theta) = \theta + \omega(\theta + \alpha_3) + \frac{q_3 \cdot c(\theta)}{r},$$
$$q_3 = [-\sin(\alpha_3) \quad \cos(\alpha_3)]$$
$$m_4(\theta) = \theta + \omega(\theta + \alpha_4) + \frac{q_4 \cdot c(\theta)}{r},$$
$$q_4 = [-\sin(\alpha_4) \quad \cos(\alpha_4)]$$

In the expression above, "$\theta$" is a rotation angle of the grating disk 2. "r" is a radius of the grating disk 2. "c($\theta$)" is a deflection (kinematic error) of the grating disk 2 when rotating (in FIG. 3, the center position of the grating disk 2 is "O" when the rotation angle of the grating disk 2 is 0, while the center position is "O'" when the rotation angle is $\theta$). As shown in FIG. 3, "$q_i$" is a sensitivity direction vector (tangent vector) for the first through fourth detectors 3A-3D (see FIG. 3). In addition, "i" is a detector number for the first through fourth detectors 3A-3D (1-4 in this order for the detector numbers of the first through fourth detectors 3A-3D). "$\omega(\phi)$" is an index error. The index error $\omega(\theta)$ is expressed in the following expression 2.

(Expression 2)

$$\omega(\phi) = \Sigma_{-N}^{N} C_k \exp(ik\phi) \quad (2)$$

Specifically, in step ST1, the calculation apparatus 4 multiplies each of the detected values $m_1(\theta)$-$m_4(\theta)$ obtained from the first through fourth detectors 3A-3D (expression 1) by respective coefficients $a_1$-$a_4$ in order to calculate a linear sum $m_T(\theta)$ as expressed in the following expression 3.

(Expression 3)

$$\begin{aligned} m_T(\theta) &= a_1 m_1(\theta) + a_2 m_2(\theta) + a_3 m_3(\theta) + a_4 m_4(\theta) \\ &= (a_1 + a_2 + a_3 + a_4)\theta + a_1\omega(\theta) + a_2\omega(\theta + \alpha_2) + \\ &\quad a_3\omega(\theta + \alpha_3) + a_4\omega(\theta + \alpha_4) + \\ &\quad (a_1 q_1 + a_2 q_2 + a_3 q_3 + a_4 q_4) \cdot \frac{c(\theta)}{r} \end{aligned} \quad (3)$$

The above-described coefficients $a_1$-$a_4$ are defined so as to remove terms of the rotation angle $\theta$ and the kinematic error $c(\theta)$ contained in the linear sum $m_T(\theta)$ expressed in the expression 3. Specifically, the coefficients $a_1$-$a_4$ defined to satisfy the following expression 4. In addition, the coefficients $a_1$-$a_4$ are not unique from the following expression 4, and thus the coefficient $a_1$ can be defined as "$a_1 = -1$", for example, to ensure that not all of the coefficients $a_1$-$a_4$ are "0".

(Expression 4)

$$\begin{cases} a_1 + a_2 + a_3 + a_4 = 0 \\ a_1 q_1 + a_2 q_2 + a_3 q_3 + a_4 q_4 = 0 \end{cases} \quad (4)$$

Since the coefficients $a_1$-$a_4$ are defined as described above, the terms of the rotation angle $\theta$ and the kinematic error $c(\theta)$ are removed from the expression 3, and the linear sum $m_T(\theta)$ is expressed in the following expression 5.

(Expression 5)

$$m_T(\theta) = a_1\omega(\theta) + a_2\omega(\theta+\alpha_2) + a_3\omega(\theta+\alpha_3) + a_4\omega(\theta+\alpha_4) \quad (5)$$

Next, the calculation apparatus 4 (Fourier component identifier 42) identifies a Fourier component $C_k$ of the index error $\omega(\phi)$, based on a Fourier component $G_k$ of the linear sum $m_T(\theta)$ (step ST 2: Fourier component identification step). Specifically, the calculation apparatus 4 performs Fourier series expansion on the linear sum $m_T(\theta)$ expressed in the expression 5, and obtains the following expression 6.

(Expression 6)

$$m_T(\theta) = \sum_{-N}^{N} \{G_k \cdot \exp(ik\,\theta)\} \quad (6)$$

In addition, the calculation apparatus 4 identifies a Fourier component $C_k$ of the index error $\omega(\phi)$, with the following expression 8, which is obtained from the expression 6 and the following expression 7, which is obtained by substituting the expression 2 into the expression 5.

(Expression 7)

$$m_T(\theta) = \quad (7)$$
$$\sum_{-N}^{N} \{C_k \cdot \exp(ik\,\theta)(a_1 + a_2\exp(ik\,\alpha_2) + a_3\exp(ik\,\alpha_3) + a_4\exp(ik\,\alpha_4))\}$$

(Expression 8)

$$C_k = \frac{G_k}{a_1 + a_2\exp(ik\,\alpha_2) + a_3\exp(ik\,\alpha_3) + a_4\exp(ik\,\alpha_4)} \quad (8)$$

However, when identifying the Fourier component $C_k$ of the index error $\omega(\phi)$ with the above method, a first degree Fourier component $C_1$ cannot be identified. Specifically, when the second expression of the expression 4 is expanded, the following expression 9 is established. Therefore, when k=±1, the denominator of the expression 8 becomes "0", which makes it impossible to identify the first degree Fourier component $C_1$.

(Expression 9)

$$a_1 q_1 + a_2 q_2 + a_3 q_3 + a_4 q_4 = 0 \quad (9)$$

$$\Rightarrow a_1 \begin{bmatrix} -\sin\alpha_1 \\ \cos\alpha_1 \end{bmatrix} +$$

$$a_2 \begin{bmatrix} -\sin\alpha_2 \\ \cos\alpha_2 \end{bmatrix} + a_3 \begin{bmatrix} -\sin\alpha_3 \\ \cos\alpha_3 \end{bmatrix} + a_4 \begin{bmatrix} -\sin\alpha_4 \\ \cos\alpha_4 \end{bmatrix} = \begin{bmatrix} 0 \\ 0 \end{bmatrix}$$

$$\Rightarrow a_1 \begin{bmatrix} \pm i\sin\alpha_1 \\ \cos\alpha_1 \end{bmatrix} + a_2 \begin{bmatrix} \pm i\sin\alpha_2 \\ \cos\alpha_2 \end{bmatrix} + a_3 \begin{bmatrix} \pm i\sin\alpha_3 \\ \cos\alpha_3 \end{bmatrix} +$$

$$a_4 \begin{bmatrix} \pm i\sin\alpha_4 \\ \cos\alpha_4 \end{bmatrix} = \begin{bmatrix} 0 \\ 0 \end{bmatrix}$$

$$\Rightarrow a_1 \exp(\pm i\alpha_1) + a_2 \exp(\pm i\alpha_2) + a_3 \exp(\pm i\alpha_3) + a_4 \exp(\pm i\alpha_4)$$

When the first through fourth detectors 3A-3D are arranged on angles divided by K (when the circumference of the grating disk 2 is divided by K), it becomes impossible to identify, for the index error $\omega(\phi)$, an $nK \pm 1^{th}$ (n=1, 2, ...) degree Fourier component $C_{nK \pm 1}$ and an $nK^{th}$ (n=1, 2, ...) degree Fourier component $C_{nK}$. Specifically, when the first through fourth detectors 3A-3D are arranged on angles divided by K, the arranged positions $\alpha_1$-$\alpha_4$ of the first through fourth detectors 3A-3D are expressed in the following expression 10. As described above, the arrangement position $\alpha_1$ of the first detector 3A is "0".

(Expression 10)

$$\alpha_2 = \frac{L_2 \cdot 2\pi}{K}, \alpha_3 = \frac{L_3 \cdot 2\pi}{K}, \alpha_4 = \frac{L_4 \cdot 2\pi}{K}, \quad (10)$$

($L_2$, $L_3$, $L_4$ are each integers)

When k=nK±1, the denominator of the expression 8 is expanded as shown in the following expression 11 based on the expression 10. Similar to the expression 9, the denominator becomes "0", thereby making it impossible to identify an $nK \pm 1^{th}$ degree Fourier component $C_{nK \pm 1}$.

(Expression 11)

$$a_1 + a_2 \exp(i(nK \pm 1)\alpha_2) + a_3 \exp(i(nK \pm 1)\alpha_3) + a_4 \exp(i(nK \pm 1)\alpha_4) = \quad (11)$$

$$a_1 + a_2 \exp\left(i(nK \pm 1) \cdot \frac{L_2 \cdot 2\pi}{K}\right) + a_3 \exp\left(i(nK \pm 1) \cdot \frac{L_3 \cdot 2\pi}{K}\right) +$$

$$a_4 \exp\left(i(nK \pm 1) \cdot \frac{L_4 \cdot 2\pi}{K}\right) = a_1 + a_2 \exp\left(i\left(\pm \frac{2\pi L_2}{K}\right)\right) +$$

$$a_3 \exp\left(i\left(\pm \frac{2\pi L_3}{K}\right)\right) + a_4 \exp\left(i\left(\pm \frac{2\pi L_4}{K}\right)\right) =$$

$$a_1 + a_2 \exp(\pm i\alpha_2) + a_3 \exp(\pm i\alpha_3) + a_4 \exp(\pm i\alpha_4) = 0$$

Similarly, when k=nK, the denominator of the expression 8 is expanded as shown in the following expression 12 based on the expression 10. The denominator becomes "0" from the first expression in the expression 4, thereby making it impossible to identify an $nK^{th}$ degree Fourier component $C_{nK}$.

(Expression 12)

$$a_1 + a_2 \exp(inK\alpha_2) + a_3 \exp(inK\alpha_3) + a_4 \exp(inK\alpha_4) = \quad (12)$$

$$a_1 + a_2 \exp\left(inK \cdot \frac{L_2 \cdot 2\pi}{nK}\right) +$$

$$a_3 \exp\left(inK \cdot \frac{L_3 \cdot 2\pi}{nK}\right) + a_4 \exp\left(inK \cdot \frac{L_4 \cdot 2\pi}{nK}\right) =$$

$$a_1 + a_2 \exp(i \cdot 2\pi L_2) + a_3 \exp(i \cdot 2\pi L_3) + a_4 \exp(i \cdot 2\pi L_4) = 0$$

Accordingly, in the present embodiment, within the Fourier component $C_k$ of the index error $\omega(\phi)$, the first through fourth detectors 3A-3D are provided so that the component of the required degree does not become indefinite.

According to the above-described embodiment, the following effects may be obtained. According to the present embodiment, the calculation apparatus 4 is provided with the detected value synthesizer 41 and the Fourier component identifier 42. Accordingly, the calculation apparatus 4 respectively multiplies each of the detected values $m_1(\theta)$-$m_4(\theta)$ obtained from the first through fourth detectors 3A-3D by predetermined coefficients $a_1$-$a_4$, in order to calculate a linear sum $m_T(\theta)$. Then, the Fourier component $G_k$ of the linear sum $m_T(\theta)$ and the Fourier component $C_k$ of the index error $\omega(\phi)$ are compared to identify the Fourier component $C_k$ of the index error $\omega(\phi)$. Accordingly, while minimizing the number of the detectors 3, it is possible to estimate a highly accurate index error $\omega(\phi)$ that does not lack any component including a higher degree component.

Further, since the coefficients $a_1$-$a_4$ are defined as described above, it is possible to remove terms of the rotation angle $\theta$ and the kinematic error $c(\theta)$ contained in the linear sum $m_T(\theta)$, and by comparing the Fourier component $G_k$ of the linear sum $m_T(\theta)$ and the Fourier component $C_k$ of the index error $\omega(\phi)$, it is possible to identify the Fourier component $C_k$ of the index error $\omega(\phi)$.

Then, by using the estimated highly accurate index error $\omega(\phi)$, it is possible to preferably estimate the rotation angle $\theta$ of the grating disk 2 as an angle having no index error $\omega(\phi)$. In addition, the four detectors 3A-3D are provided to the grating disk 2. Therefore, using each of the detected values $m_1(\theta)$-$m_4(\theta)$ obtained from the respective four detectors 3A-3D, it is possible to preferably estimate the rotation angle $\theta$ of the grating disk 2 as an angle having no kinematic error $c(\theta)$. Therefore, the rotation mechanism of the grating disk 2 is not required to be extremely accurate, thereby reducing the cost for manufacturing the index error calibrating apparatus 1.

The present invention is not limited to the above-described embodiment, and may include any alternatives and/or improvements within a scope of the present invention. For example, while the number of the detectors 3 is four in the present embodiment, the number of the detectors 3 is not limited to four. Five or more detectors 3 may be provided. When five or more detectors 3 are provided, an analysis can be performed similar to the case where four detectors 3 are provided as illustrated in the present invention. Thereby, the redundancy of the data is increased to obtain an even more accurate rotation angle $\theta$ of the grating disk 2. Additionally, when five or more detectors 3 are provided and when each of the detectors 3 is positioned on angles divided by a large value of K, it is possible to shift even an indefinite Fourier component to a higher degree. In the present embodiment, a rotary encoder having a disk shape is used for the present invention.

However, the present invention is not limited to this and a rotary encoder having a drum shape may be employed for the present invention.

The present invention can be utilized for an index error calibrating apparatus having a grating disk supported by a rotation shaft, and at least four detectors provided on the grating disk.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An index error calibrating apparatus comprising:
   a grating disk supported by a rotation shaft;
   at least four detectors arranged on the grating disk; and
   an index error estimator comprising:
      a detected value synthesizer configured to calculate a linear combination by multiplying by a coefficient of each of detected values obtained from each of the at least four detectors; and
      a Fourier component identifier that uses a Fourier component of the linear combination and that is configured to identify a Fourier component of the index error.

2. The index error calibrating apparatus according to claim 1, wherein the coefficient is defined so as to remove a rotation angle and a kinematic error contained in the linear combination.

3. An index error estimating method comprising:
   providing an index error calibrating apparatus that has a grating disk supported by a rotation shaft and at least four detectors arranged on the grating disk;
   synthesizing detected values to calculate a linear combination by multiplying by a coefficient each of the detected values obtained from each of the at least four detectors; and
   identifying a Fourier component of the index error by using a Fourier component of the linear combination.

* * * * *